(12) United States Patent
Bruekers et al.

(10) Patent No.: US 6,320,825 B1
(45) Date of Patent: Nov. 20, 2001

(54) METHOD AND APPARATUS FOR RECORDING COMPRESSED VARIABLE BITRATE AUDIO INFORMATION

(75) Inventors: Alphons A.M.L. Bruekers; Wiebe De Haan; Johannus L. Bakx; Leon M. Van De Kerkhof, all of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/355,380

(22) PCT Filed: Nov. 23, 1998

(86) PCT No.: PCT/IB98/01860

§ 371 Date: Jul. 26, 1999

§ 102(e) Date: Jul. 26, 1999

(87) PCT Pub. No.: WO99/28902

PCT Pub. Date: Jun. 10, 1999

(30) Foreign Application Priority Data

Nov. 29, 1997 (EP) .................................................. 97203743

(51) Int. Cl.$^7$ .................................................. G11B 17/22
(52) U.S. Cl. .............................................................. 369/32
(58) Field of Search ................................. 369/32, 33, 47, 369/48, 59, 58, 54; 348/390.1, 405.1, 419.1; 360/8

(56) References Cited

U.S. PATENT DOCUMENTS

| | | | |
|---|---|---|---|
| 5,541,852 | * | 7/1996 | Eyuboglu et al. .................... 709/232 |
| 5,596,564 | * | 1/1997 | Fukushima et al. ............. 369/275.3 |
| 5,867,230 | * | 2/1999 | Wang et al. ......................... 348/845 |
| 5,872,598 | * | 2/1999 | Legall et al. ......................... 348/405 |
| 5,929,914 | * | 7/1999 | Normand .............................. 348/405 |
| 5,929,916 | * | 7/1999 | Legall et al. ......................... 348/419 |
| 5,990,945 | * | 11/1999 | Sinha et al. ........................... 348/219 |

FOREIGN PATENT DOCUMENTS

| | | |
|---|---|---|
| 0402973A1 | 12/1990 | (EP) . |
| WO97/01156 | 1/1997 | (WO) . |
| WO97/701303 | 1/1997 | (WO) . |
| WO99/28902 | 6/1999 | (WO) . |

OTHER PUBLICATIONS

"A Digital Decimating Filter for Analog–to–Digital Conversion of HI–FI Audio Signals", by J.J. Van Der Kam in Philips Techn. Rev. 42, No. 6/7, Apr. pp. 230–238.

"A Higher Order Topology for Interpolative Modulators for Oversampling A/D Converters", By Kirk C.H. Chao et al in IEEE Trans. on Circuits and Systems, vol. 27, No. 3, Mar. 1990, pp. 309–318.

\* cited by examiner

*Primary Examiner*—Tan Dinh
(74) *Attorney, Agent, or Firm*—Michael E. Belk (57) ABSTRACT

A method for recording audio information on a record carrier, typically a bitstream signal on an optical disc, is disclosed. In the method the audio information is encoded to compressed audio data having a variable bitrate, in particular using lossless compression. The compressed audio data is recorded at a transfer speed which is controlled in dependence on the variable bitrate. A transfer speed profile (53, 54, 55) is determined for items of audio information, e.g. for each track on a CD, in which profile the average transfer speed is higher than an average transfer speed minimally required to transfer the compressed audio data of said item. Stuffing data is added to the compressed audio data according to the transfer speed profile, and transfer speed profile information is recorded on the record carrier for enabling playback at a transfer speed as indicated by the transfer speed profile information. Also a recording device, a record carrier and a playback device are disclosed.

13 Claims, 4 Drawing Sheets

|  | # bits |
|---|---|
| TOC ( ) { | |
|     Signature | 128 |
|     Spec_version | 16 |
|     TOC_length | 32 |
|     reserved | 80 |
|     /* Disc parameter */ | |
|     Album ( ) | |
|     Catalogue ( ) | |
|     disc_play_time | 32 |
|     disc_name_pointer | 32 |
|     disc_date_pointer | 32 |
|     disc_copyright_pointer | 32 |
|     disc_publisher_pointer | 32 |
|     Track_list ( ) | |
| | |
|     if (disc_name_pointer != 0) disc_name ( ) | |
|     if (disc_date_pointer != 0) disc_date ( ) | |
|     if (disc_copyright_pointer != 0) disc_copyright ( ) | |
|     if (disc_publisher_pointer != 0) disc_publisher ( ) | |
| } | |

FIG. 6A

|  | # bits |
|---|---|
| Track_list ( ) { | |
|     Number_of_tracks | 8 |
|     for (i=0; i<Number_of_tracks; i++) { | |
|         Track_start_address | 32 |
|         Track_length | 32 |
|         Track_start_time_code | 32 |
|         Track_time_length | 32 |
|         Bit_rate | 16 |
|         sample_frequency | 6 |
|         lossless_coded_bit | 1 |
|         Copyright_information | 64 |
|         ISRC ( ) | |
|         Track_crew ( ) | |
|         Genre ( ) | |
|         Index_list ( ) | |
|     } | |
| } | |

FIG. 6B

METHOD AND APPARATUS FOR RECORDING COMPRESSED VARIABLE BITRATE AUDIO INFORMATION

FIELD OF THE INVENTION

The invention is related to the field of recording variable bitrate compressed digital audio signals.

BACKGROUND OF THE INVENTION

The invention relates to a method for recording audio information on a record carrier, the method comprising the steps of encoding the audio information to compressed audio data having a variable bitrate, recording the compressed audio data at a transfer speed, and controlling the transfer speed in dependence on the variable bitrate.

The invention further relates to a device for recording audio information on a record carrier, the device comprising compression means for encoding the audio information to compressed audio data having a variable bitrate, recording means for recording the compressed audio data at a transfer speed, and a control unit for controlling the transfer speed in dependence on the variable bitrate.

The invention further relates to a record carrier carrying audio information, which audio information is encoded to compressed audio data having a variable bitrate, and transfer speed information for controlling a transfer speed at playback.

The invention further relates to a playback device for retrieving audio information from the record carrier, the device comprising reading means for retrieving the compressed audio data at a transfer speed, and a control unit for controlling the transfer speed.

Such a method and apparatus are known from Research Disclosure 36411, document D1 in the list of related documents. The document discloses a system for variable speed recording of audio information on a record carrier, in particular speech on a magnetic tape. Compression of the audio information is used to minimize tape consumption and realize a high effective audio information density, i.e. the amount of audio information per unit of record carrier surface. When data is recorded on the tape at a constant spatial data density the data transfer speed is proportional to the tape transport speed. The known recording apparatus comprises an audio compressor for encoding the audio information to digital audio data having a variable bitrate. A channel encoder formats the compressed audio data and passes the data to a recording head via a smoothing buffer. The actual bitrate of the compressed audio data at the output of the audio compressor is measured by a bitrate determining means, which means controls the tape transport speed in dependence on the actual bitrate. The buffer is kept half full during normal operation and will absorb sudden changes in the actual bitrate, while the tape transport speed can be adapted according to the data rate changes at the output of the smoothing buffer. A speed control signal, indicating the actual tape transport speed at the moment of recording, may be recorded on the record carrier, e.g. a clock signal in a separate track of the tape. An optical disc is mentioned as record carrier in a further embodiment, which embodiment comprises a buffer sufficiently large to store the data recordable in one winding of the track. Recording is performed for one complete revolution of the disk and then halted until the buffer again contains sufficient data. The average data transfer speed of the disc is controlled by jumping back, i.e. moving the head to the previous track when recording is halted, while the transport speed of the disc relative to the recording head, called the linear speed, is not changed. Those skilled in the art are directed to the following related documents:

(D1) Research Disclosure number 36411. August 1994, page 412–413

(D2) PCT/IB97/01156 (PHN 16.452) 1 bit ADC and lossless compression of audio (D3) PCT/IB97/01303 (PHN 16.405) Audio compressor (D4) EP-A 402,973 (PHN 13.241) Audio compression (D5) 'A digital decimating filter for analog-to-digital conversion of hi-fi audio signals', by J. J. van der Kam in Philips Tech. Rev. 42, no. 6/7, April 1986, pp. 230–8

(D6) 'A higher order topology for interpolative modulators for oversampling A/D converters', by Kirk C. H. Chao et al in IEEE Trans. on Circuits and Systems, Vol 37, no. 3, March 1990, pp. 309–18.

The above citations are hereby incorporated in whole by reference.

SUMMARY OF THE INVENTION

The known recording apparatus and record carrier have the problem, that changing the data transfer speed by controlling the transport speed and/or moving the head requires complex control means and relatively powerful servo motors, while frequent transport speed changes and/or head movements cause excessive wear.

It is an object of the invention to provide means for transferring audio information via a record carrier in a less complex way, while realizing a high effective information density.

For this purpose a method as described in the opening paragraph is characterized according to the invention in that the method comprises the steps of determining a transfer speed profile for an item of audio information in which profile the average transfer speed is higher than an average transfer speed minimally required to transfer the compressed audio data of said item, adding stuffing data to the compressed audio data according to the transfer speed profile, and recording transfer speed profile information on the record carrier for enabling playback at a transfer speed as indicated by the transfer speed profile information.

For this purpose a recording device as described in the opening paragraph is characterized according to the invention in that the control unit is arranged for determining a transfer speed profile for an item of audio information in which profile the average transfer speed is higher than an average transfer speed minimally required to transfer the compressed audio data of said item, and in that the device comprises data combination means for adding stuffing data to the compressed audio data according to the transfer speed profile, and in that the recording means are arranged for recording transfer speed profile information on the record carrier for enabling playback at a transfer speed as indicated by the transfer speed profile information.

For this purpose a record carrier as described in the opening paragraph is characterized according to the invention in that the transfer speed information comprises transfer speed profile information, the transfer speed profile indicating the transfer speed at playback for an item of audio information, in which profile the average transfer speed is higher than an average transfer speed minimally required to transfer the compressed audio data of said item, and in that the record carrier comprises stuffing data in addition to the compressed audio data according to the transfer speed profile.

For this purpose a playback device as described in the opening paragraph is characterized according to the invention in that the device comprises data selection means for retrieving the transfer speed profile information from the record carrier and for removing stuffing data from the data retrieved, and in that the control unit is arranged for setting the transfer speed for an item of audio information according to the transfer speed profile.

The above means according to the invention enable transferring audio information via a record carrier as follows. On the record carrier the audio information is accessible for a user as one item or several separate items. An item of audio information is to be construed as a coherent amount of audio information of a certain playing time. An item may be a song or a set of songs, or a representation in stereo or a multi channel format, or the audio information may be subdivided in items of a certain playing time, e.g. for the convenience of the user in pieces of a few minutes like individual songs or parts of a the symphony, as usual on an audio CD. An item may be preceded and followed by silent fragments or a pause of a few seconds, but it may also be a part of a larger and continuing piece of music. A transfer speed profile for an item of audio information indicates the actual transfer speed of the record carrier when reproducing the respective item. The actual transfer speed may be constant or vary during reproduction of the item, but the actual value (or values and the pattern of change) is determined during the recording process and indicated by the transfer speed profile. The minimally required average transfer speed as used in the known apparatus from D1 gives the highest effective audio information density, but produces also substantial changes in transport speed of the tape. In our invention advantageously uses an average transfer speed higher then the average transfer speed minimally required to provide a degree of freedom for controlling the actual transfer speed and limiting the amount of change per unit of time thereof. Said average transfer speed is set to a value so much higher, that the transport speed of the record carrier can be effectively kept within a predetermined range of speeds, and that changes of transport speed can be controlled to take place slowly. A control of the transport speed is accomplished by said new degree of freedom, whereas a modest decrease of the effective information density is acceptable. This has the advantage, that the transport speed is less variable and less power is required for changing the transport speed. Stuffing data is added to the data to be transferred for matching the data transfer capacity of the channel constituted by the record carrier at the established speed profile. Transfer speed profile information indicative of the transfer speed profile is recorded on the record carrier and is to be retrieved before the actual compressed audio data is read. This has the advantage, that it allows to adjust the record carrier transport speed when jumping to a specified playing time by calculating the total amount of data from the start of an item, e.g. by multiplying the transfer speed and the playing time. The transfer speed at playback is to be controlled according to the retrieved transfer speed profile information. Hence a recording engineer or an automatic recording process is able to set the transfer speed during recording and playback by determining the transfer speed profile. For example a fragment of an audio item which is difficult to compress and therefore results in a sharp increase in bitrate can be anticipated by setting a higher transfer speed even before the difficult fragment arrives. Setting the transfer speed according to the speed profile has the advantage, that the modest decrease in effective audio information density can be balanced against control of the transport speed of the record carrier. The invention is particularly suitable for a disc shaped record carrier of an optically readable type, such as CD.

The invention is also based on the following recognition relating to the effects of transfer speed variations. In the device known from D1 as described above the actual transfer speed during recording is directly related to the complexity of the audio signal, because the variable bitrate compressor is more effective for reducing 'easy' fragments and requires more bits for 'difficult' fragments of audio information and the actual tape transport speed is matched to the resulting compressed audio bitrate. Hence, in the known device the actual transfer speed can vary substantially, e.g. when a user stops talking to his dictation recorder. It is to be noted that a buffer may be used for smoothing variations, however such a buffer is only effective for variations in a time period determined by the buffer size. In practical circumstances a buffer of economically viable size may smooth bitrate variations of low quality audio information to a variation of speed which can be accommodated by the respective transport speed servo motors as disclosed in D1. However the transport speed variation are still substantial, especially for high-quality audio information, because the bitrate for high-quality audio is high and therefore the buffer covers only a short period. Moreover the inventors have seen that such substantial speed variation are a disadvantage for high quality audio systems, as the speed variations or head jumps may cause mechanical noise in the playback device disturbing a demanding audio consumer. Also, said speed variations or jumps may cause interference or jitter in the audio output signal. This especially relevant when a lossless compressor is applied for achieving impeccable audio quality at an acceptable audio information density. In a lossless compressor the resulting bitrate varies strongly with the audio content and there is no option to smooth peaks in view of possible overflow or underflow problems in the playback buffer by decreasing the amount of bits produced by increasing the compression rate, e.g. by temporarily lowering the objective picture quality as used in MPEG video compression.

Further advantageous, preferred embodiments according to the invention are given in the dependent claims.

Other alternatives and advantages of the inventions herein will be disclosed or become obvious to those skilled in the art by studying the detailed description below with reference to the following drawings which illustrate the elements of the appended claims of the inventions.

Corresponding elements in different Figures have identical reference numerals.

DETAILED DESCRIPTION OF THE PREFERRED EMBODIMENTS

Figure 1A:
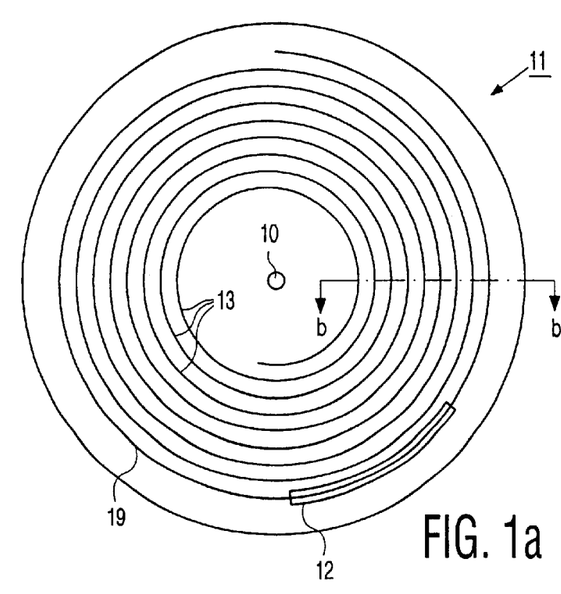
FIGS. 1*a* and 1*b* shows a record carrier.

FIG. 1*a* shows a disc-shaped record carrier 11 having a track 19 and a central hole 10. The track 19 is arranged in accordance with a spiral pattern of turns constituting substantially parallel tracks on an information layer. The record carrier may be an optical disc having an information layer of a recordable type or of a prerecorded type. Examples of a recordable disc are the CD-R and CD-RW, and the DVD-RAM, whereas the audio CD is an example of a prerecorded disc. The prerecorded type can be manufactured in a well known way by first recording a master disc and subsequently pressing consumer discs. The track 19 on the recordable type of record carrier is indicated by a pre-embossed track structure provided during manufacture of the blank record carrier. The track structure is constituted, for example, by a pregroove 14 which enables a read/write head to follow the track 19 during scanning. The information is represented on the information layer by optically detectable marks recorded along the track, e.g. pits and lands.

Figure 1B:
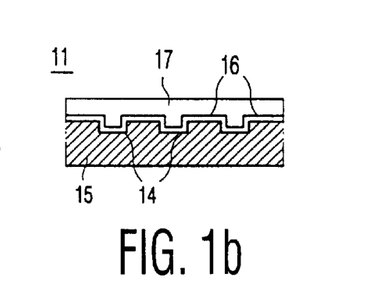

FIG. 1b is a cross-section taken along the line b—b of the record carrier 11 of the recordable type, in which a transparent substrate 15 is provided with a recording layer 16 and a protective layer 17. The pregroove 14 may be implemented as an indentation or an elevation, or as a material property deviating from its surroundings.

The record carrier carries audio information, which audio information is subdivided in items for the convenience of the user, the item being usually a few minutes in duration, e.g. songs on an album or movements of a symphony. Usually access information for identifying the items is also provided on the record carrier, e.g. in a so called Table Of Contents (TOC) or included in a file system like ISO 9660 for CD-ROM. The access information may include a playing time and a start address for each item, and also further information like a song title.

The audio information is recorded in a digital representation after analog to digital (A/D) conversion. Examples of A/D conversion are PCM 16 bit per sample at 44.1 kHz as known from CD audio and 1 bit Sigma Delta modulation at a high oversampling rate e.g. 64×Fs, usually called bitstream. Converting an audio signal into a 1-bit bitstream signal has a number of advantages. Bitstream conversion is a high quality encoding method, with the possibility of a high quality decoding or a low quality decoding with the further advantage of a simpler decoding circuit. Reference is made in this respect to the publications 'A digital decimating filter for analog-to-digital conversion of hi-fi audio signals', by J. J. van der Kam, document D5 in the list of related documents, and 'A higher order topology for interpolative modulators for oversampling A/D converters', by Kirk C. H. Chao et al, document D6 in the list of related documents. After A/D conversion the digital audio is compressed to compressed audio data, which has a variable bitrate and is recorded on the information layer. The compressed audio data is to be read from the record carrier at such a speed that, after decompression, substantially the original timescale is restored when reproducing the audio information continuously. Hence the compressed data must be retrieved from the record carrier at a speed dependent on the varying bitrate. The speed of retrieving data from the record carrier is called transfer speed, i.e. the speed of transferring data bytes from the record carrier to a de-compressor. Preferably the record carrier has a constant spatial data density, which gives the highest data storage capacity per record carrier. In such a system the transfer speed is proportional to the relative linear speed between the medium and the read/write head. If a buffer is provided before the de-compressor the actual transfer speed is the speed before that buffer.

According to the invention the record carrier comprises transfer speed information for controlling the actual transfer speed at playback, which transfer speed information comprises transfer speed profile information. The transfer speed profile indicates the transfer speed at playback for an item of audio information. The transfer speed profile is to be retrieved before the retrieval of the item starts, and the required transfer speed for the start of the item must be set first. Therefore the transfer speed profile information is located separately from the audio information, e.g. in a separate file or in a header at the beginning of an audio item or in the TOC. The record carrier transport speed must be adjusted to this setting, e.g. for a disc shaped record carrier the speed of rotation must be adjusted. The transfer speed may be denoted as a bitrate or byterate of the reading signal, but alternatively other suitable indications, such as the rotation speed for a disc shaped record carrier may be used. The transport speed may be measured by counting the number of bits per unit of time in the read signal, which number can be compared to the required transfer speed indicated in the speed profile. The transfer speed averaged for the playing time of the item is higher than an average transfer speed minimally required to transfer the compressed audio data of said item. If the minimally required average speed were used, compressed audio data is recorded on the disc, respectively read from the disc, only when needed, which would result in substantial changes in transport speed of the record carrier. In the invention the average transfer speed is higher then minimally required, and some data transfer capacity is not used for audio data transport, e.g. during less complex audio fragments. In practical circumstances an average transfer speed of 5% to 25% higher can be used. The remaining data transfer capacity is filled with stuffing data, so that the total of the compressed audio data, the stuffing data and possible other supplemental data completely covers the transfer capacity according to the transfer speed profile. Said substantial changes in transport speed of the record carrier can be decreased or completely eliminated by adding the stuffing data only at those moments, where the bitrate of the compressed audio is relatively low.

An embodiment of the transfer speed profile comprises a fixed bitrate per item. In the playback device the fixed bitrate is to be set before the reading of the item starts, and the actual bitrate may be controlled via a comparison to a generated frequency. In between items, or during a jump to a new item, the generated frequency may be set to a new value before the reproduction of the next item is stated.

An embodiment of the transfer speed profile comprises per item at least one speed indicator indicative for a bitrate at a specified time within said item. The speed indicator indicates the transfer speed at specified points in time within the playing time of the item. A specified time can also be given via a selected address within the address range storing said item corresponding to said point in time. A few selected addresses and corresponding speeds may be used to define a speed profile having peaks and valleys. The selected address can be chosen during encoding in dependence on the complexity of the surrounding audio fragments, e.g. for a concentration of difficult fragments a relatively high rate together with the corresponding address is included. In the playback device the bitrate of the first speed indicator is to be used from the start of the item until the playing time indicated in the first speed indicator. Then a calculation is to be performed for finding the bitrate between two speed indicators, e.g. by linear interpolation. From the last speed indicator until the end of the item the bitrate indicated in the last speed indicator is to be used. Alternatively a predetermined speed may be chosen for the beginning and end of each item, so as to smoothly join items when editing. Now the bitrate may also be determined by interpolation from the start to a first speed indicator. An example of such a speed profile is shown in FIG. 5.

An embodiment of the transfer speed profile comprises per item at least one speed change indicator. The speed change indicator can be indicative for a speed gradient, i.e. a change per unit of time, or for an address or playing time at which the speed is to be incremented or decremented with a specified or predetermined amount. The speed indicator as described with the previous embodiment may be combined with the speed change indicator. The speed gradient is given for determining the change of the bitrate in time as an alternative for interpolation. Alternatively a fixed increment or decrement value may be established, and the playing time code for applying the increment or decrement may be given.

Alternatively the above embodiments of the transfer speed profile comprise a rotation rate of a disc-shaped record carrier as an indication of the bitrate. This has the advantage, that when a jump is performed to a different radial position of the read head, the rotation rate of the carrier retrieved from the speed profile and adjustment can start immediately when the jump is started, i.e. before the head arrives at its target position and starts reading again, which would be required to measure the actual bitrate.

Figure 2:
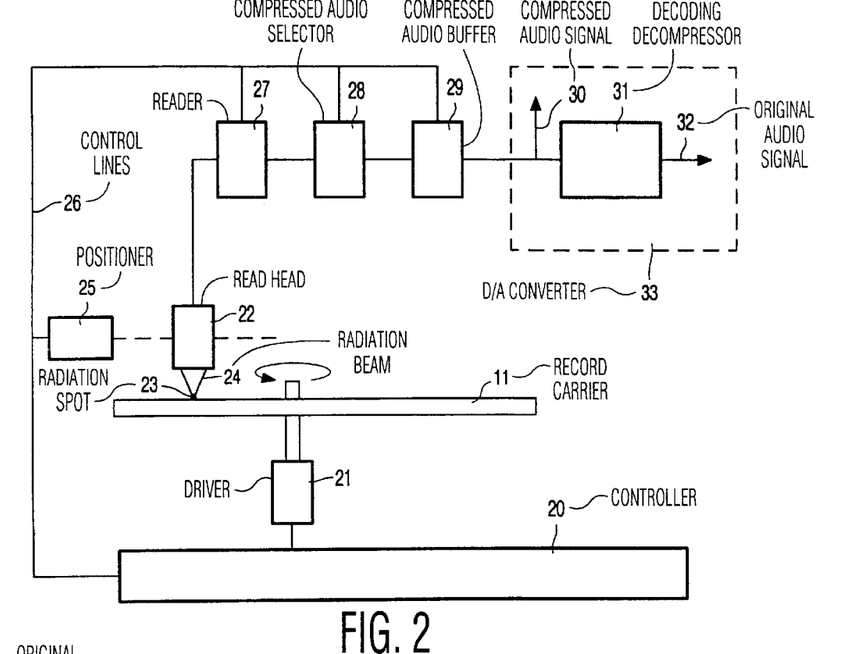
FIG. 2 shows a playback device.

FIG. 2 shows a playback apparatus according to the invention for reading a record carrier 11, which record carrier is identical to the record carrier shown in FIG. 1. The device is provided with drive means 21 for rotating the record carrier 1, and a read head 22 for scanning the track on the record carrier. The apparatus is provided with positioning means 25 for coarsely positioning the read head 22 in the radial direction on the track. The read head comprises an optical system of a known type for generating a radiation beam 24 guided through optical elements focused to a radiation spot 23 on a track of the information layer of the record carrier. The radiation beam 24 is generated by a radiation source, e.g. a laser diode. The read head further comprises a focusing actuator for moving the focus of the radiation beam 24 along the optical axis of said beam and a tracking actuator for fine positioning of the spot 23 in a radial direction on the centre of the track. The tracking actuator may comprise coils for radially moving an optical element or may be arranged for changing the angle of a reflecting element. The radiation reflected by the information layer is detected by a detector of a usual type, e.g. a four-quadrant diode, in the read head 22 for generating a read signal and further detector signals including a tracking error and a focusing error signal coupled to said tracking and focusing actuators. The read signal is processed by a reading means 27 to retrieve the data, which reading means are of a usual type for example comprising a channel decoder and an error corrector. The retrieved data is passed to a data selection means 28. The data selection means selects the compressed audio data from all data read and passes the compressed audio data to buffer 29. The selection is based on data type indicators also recorded on the record carrier, e.g. headers in a framed format. The compressed audio data is passed on from buffer 29 to a de-compressor 31 via signal 30. This signal may also be available as an output signal to an external de-compressor. The de-compressor 31 decodes the compressed audio data to reproduce the original audio information on output 32. It is to be noted, that the de-compressor may be fitted in a separate housing, e.g. in a stand-alone high quality audio digital to analog convertor (D/A convertor), as indicated by the dashed rectangle 33 in FIG. 2. It is to be noted, that alternatively the buffer may be positioned before the data selections means. The buffer 29 may also be positioned in the separate housing, or may be combined with a buffer in the decompressor. The device is further provided with a control unit 20 for receiving commands from a user or from a host computer for controlling the apparatus via control lines 26, e.g. a system bus, connected to the drive means 21, the positioning means 25, the reading means 27 and the data selection means 28, and possibly also to buffer 29 for buffer filling level control. To this end, the control unit 20 comprises control circuitry, for example a microprocessor, a program memory and control gates, for performing the procedures described below. The control unit 20 may also be implemented as a state machine in logic circuits.

Audio compression and de-compression of a suitable type is known. Audio may be compressed after digitizing by analyzing the correlation in the signal, and producing parameters for fragments of a specified size. During de-compression an inverse process is applied to reconstruct the original signal. If the original, digitized signal is reconstructed exactly the (de-)compression is called lossless, whereas in lossy (de-)compression some details of the original signal are not reproduced, which omitted details are substantially undetectable by the human ear (eye). Most known systems, such as DCC or MPEG, use lossy compression for audio (and video), whereas lossless compression is known from storing computer data. Examples of audio compression and decompression can be found in D2, D3 and D4 of the list of related documents, in particular the lossless compression from D2 is suitable for high quality audio.

According to the invention the data selection means 28 are arranged for retrieving control information from the data read, in particular the transfer speed profile information. The data selection means 28 are also arranged to discard any stuffing data, which stuffing data, are added during recording according to the speed profile. When the control unit 20 is commanded to reproduce an item of audio from the record carrier, the positioning means 25 are controlled to position the reading head on the portion of the track containing the TOC. The starting address and the speed profile for that item are retrieved from the TOC via the data selection means 28. Alternatively the contents of the TOC may be read once and stored in a memory when the disc is inserted in the apparatus. For reproducing the item the drive means 21 are controlled to rotate the record carrier at the speed indicated by the speed profile. The required rotation rate may be denoted as such in the speed profile for setting the drive means. Alternatively the speed profile may comprise a bitrate, and then the rotation rate can be calculated as follows. The radial position of the item can be calculated based on the starting address, because the record carrier density parameters, like track pitch and bit length, are predetermined and known to the playback device, usually from a standard. Subsequently the rotation rate can be derived from the bitrate and said radial position.

To provide a continuous reproduction without buffer underflow or overflow the transfer speed should be coupled to the reproduction speed of the D/A convertor, i.e. to the bitrate after decompression. To this end the apparatus may comprise a reference frequency source for controlling the decompressor and the rotation rate may be set in dependence on the reference frequency and the speed profile. Alternatively or additionally the rotation rate may be adjusted using the average filling level of the buffer 29, e.g. decreasing the rotation rate when the buffer is more then 50% fill on average.

Figure 3:
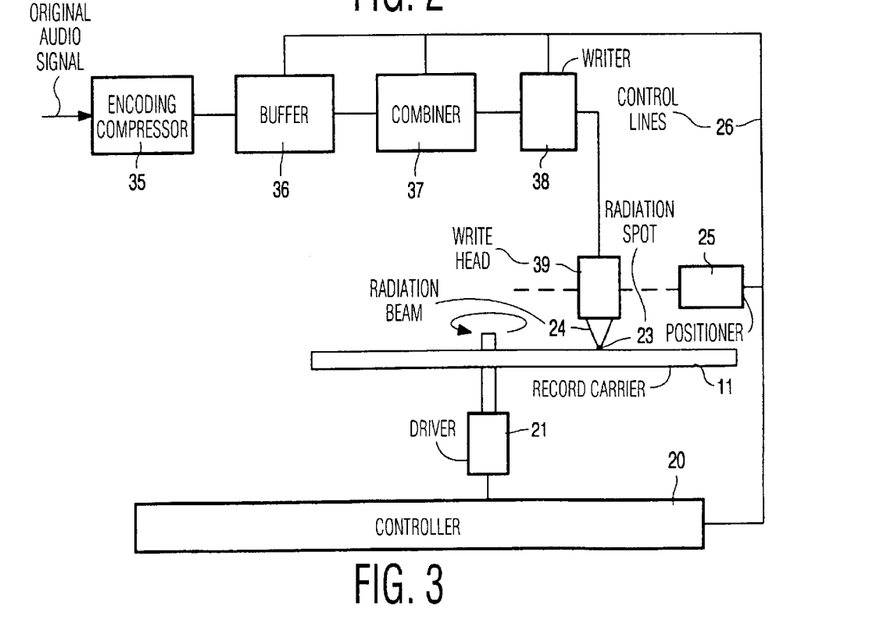
FIG. 3 shows a recording device.

FIG. 3 shows a recording device for writing information on a record carrier 11 according to the invention of a type which is (re)writable. During the writing operation, marks representing the information are formed on the record carrier. The marks may be in any optically readable form, e.g. in the form of areas with a reflection coefficient different from their surroundings, obtained when recording in materials such as dye, alloy or phase change, or in the form of areas with a direction of magnetization different from their surroundings, obtained when recording in magneto-optical material. Writing and reading of information for recording on optical disks and usable formatting, error correcting and channel coding rules are well-known in the art, e.g. from the CD system. The marks can be formed by means of a spot 23 generated on the recording layer via a beam 24 of electromagnetic radiation, usually from a laser diode. The recording device comprises similar basic elements as the apparatus for reading described above with FIG. 2, i.e. a control unit 20, a drive means 21 and a positioning means 25, but it has a write head 39. Audio information is presented on the input of compression means 35, which may be placed in a separate housing. Suitable compression means are described in D2, D3 and D4. The variable bitrate compressed audio on the output of the compression means 35 are passed to a buffer 36. From the buffer 36 the data is passed to data combination means 37 for adding stuffing data and further control data. The total data stream to be recorded is passed to writing means 38. The write head 39 is coupled to the writing means 38, which comprise for example a formatter, an error coder and a channel coder. The data presented to the input of the writing means 38 is distributed over logical and physical sectors according to formatting and encoding rules and converted into a write signal for the write head 39. The control unit 20 is arranged for controlling the buffer 36, the data combination means 37 and the writing means 38 via control lines 26 and for performing the positioning procedure as described above for the reading apparatus. Alternatively the recording apparatus will also be arranged for reading having the features of the playback apparatus and a combined write/read head.

According to the invention the control unit 20 of the recording device is arranged for selecting a transfer speed profile, including stuffing data when required during recording according to the selected transfer speed profile, and for recording transfer speed profile information on the record carrier as described with reference to FIG. 4.

Figure 4:
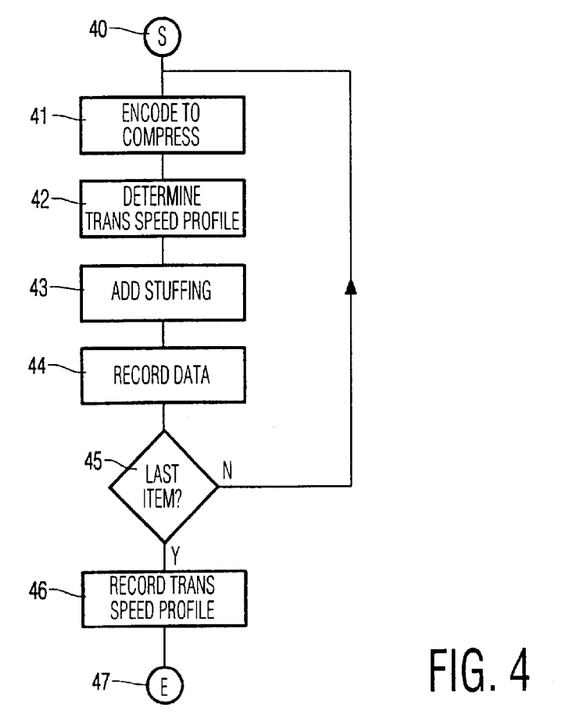
FIG. 4 shows the recording process.

FIG. 4 shows the recording method to be performed by a recording apparatus according to the invention. After the start 40 of a recording session in a first step 41 the audio information in an item of audio information is encoded to compressed audio data having a variable bitrate. The compressed data is stored in an edit buffer of a sufficiently large size, which may be implemented by temporarily storing data on a further record carrier constituting a file to be recorded later. In a second step 42 the transfer speed profile for the item is determined, based on the average amount and the peaks in the compressed audio data, as illustrated below with FIG. 5. The transfer speed profile takes into account a predetermined size of the playback buffer and a predetermined maximum change rate of speed which are available in a standardized playback apparatus. In the profile the average transfer speed is higher than an average transfer speed minimally required to transfer the compressed audio data of said item. The maximum speed is chosen as low as possible but still high enough to accommodate difficult parts in the item. In the easier parts of the item the transfer speed is higher than required to transfer the compressed audio data and excess transfer capacity remains. In an embodiment of the recording process a change of transfer speed during the item is included in the transfer speed profile, so as to lower the transfer speed during said easy parts, resulting in a higher effective audio information density and therefore a longer playing time of the record carrier. In a third step 43 stuffing data is added to the compressed audio data according to the determined transfer speed profile, to fill the excess data transfer capacity during said easy parts. In a fourth step 44 the data is recorded on the record carrier. The recording may be made in real time if the temporary store is a random access buffer, e.g. a RAM memory. The buffer must be substantially larger than the playback buffer, because the transfer speed profile can only be determined after at least a substantial part of the audio item has been encoded, and recording in real time can start only after at least the transfer speed at the beginning of the item has been determined. For real time recording the actual transfer speed of the record carrier is controlled according to the transfer speed as indicated in the transfer speed profile. The stuffing data may be added in real time during recording. Alternatively the item (or all items) are recorded not real time, but are first stored completely as a file in the edit buffer and recorded afterwards. The stuffing data and further control data may be added to the compressed audio data in that file, which file is usually called an image file. The transfer of the file from the edit buffer to the record carrier can be done at a constant and usually higher speed, e.g. as high as the recording system can handle. In a fifth step 45 after recording the item it is determined if that item was the last item. If not, the process is repeated from step 41, but after the last item in a sixth step 46 transfer speed profile information is recorded for all items, e.g. in a TOC as described below with FIG. 6. Alternatively the transfer speed profile information can be recorded separately for each item. Then the recording session ends 47.

Figure 5A:
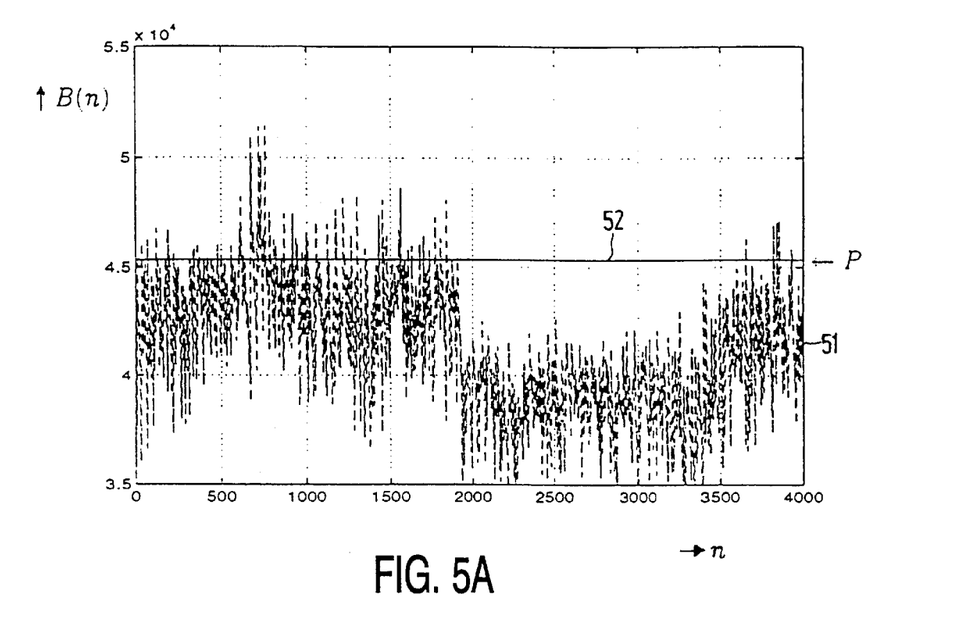
FIGS. 5*a* and 5*b* shows a variable bitrate compressed audio and speed profiles and FIGS. 6*a* and 6*b* transfer speed profile information.
Figure 5B:
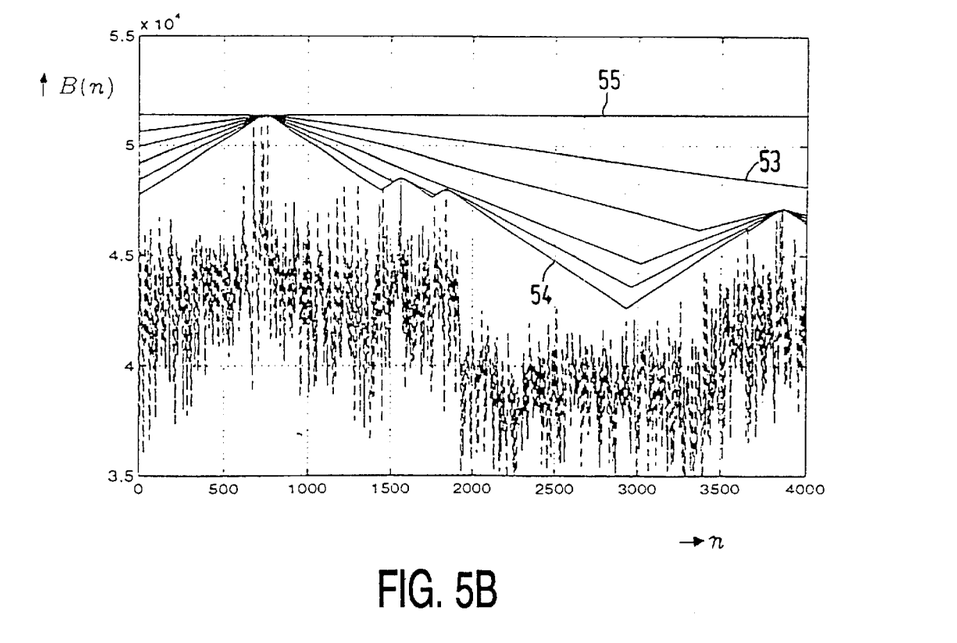

FIG. 5 shows examples of variable bitrate compressed audio and speed profiles. In FIGS. 5a and 5b the x-axis indicates the number n of units of a predetermined time, whereas the y-axis gives the size B(n) of a block of compressed audio data of a unit. In this example the units cover a time of ⅟₇₅ sec of a 1 bit bitstream signal at 2.8 Mbit/sec. The blocks of compressed audio data are formatted as usual by using headers and may have a fixed or a variable length, and are recorded on the record carrier in one or more physical sectors, e.g. sectors of 2048 bytes on a DVD. The strongly fluctuating curve 51 indicates the compressed audio data for a music sample which is losslessly compressed, of which the maximum block size is circa 52000 bits and the minimum size below 35000 bits. A substantial variation in the average size is also apparent, the first 2000 units being more difficult to encode. The curve 52 indicates a fixed bitrate speed profile for this musical item. The fixed bitrate allows average blocks of 45000 bits, and results in excess transfer capacity in the second part of the item (from unit 2000 to 4000), where stuffing data is added to fill the remaining capacity. The amount of stuffing data is indicated in the headers of the blocks. The fixed bitrate has been selected taking into account a playback buffer of a predetermined size. Without any buffer the fixed bitrate should be equal to the maximum block size in the item, i.e. at 52000 bits, as shown in the upper curve 55 in FIG. 5b. In the lower curves 53, 54 a gradual change of transfer speed has been applied. The change rate, i.e. change per unit of time, is to be limited to a maximum value which can be accommodated by the playback device, and the predetermined maximum change rate together with the chosen predetermined buffer size are to be standardized so as to allow optimized compression of audio data in a mastering studio. It is to be noted, that the change rate should be limited to a value which causes substantially no mechanical noise or electrical interference. The change rate may be standardized to be zero within an item as in the fixed bitrate curve 52, or in between items, or the rate of change may be allowed to be a predetermined number of bits or bytes per block. In a further embodiment higher order characteristics of the speed changes may be limited also, e.g. a gradual change from an increasing speed to a decreasing speed. The curves are defined in the transfer speed profile by speed indicators, which are indicating a transfer speed at a specified block number. Curve 53 has one speed indicator at block 750 and a fixed increase up to this moment and a fixed decrease after this moment. Curve 54 allows a larger increase and decrease per unit of time and has several speed indicators. The gradual change of speed (profile shown in FIG. 5*b*) and the buffer (profile shown in FIG. 5*a*) can be combined to create an even more efficient speed profile. The difficult fragment around block 750 can first be smoothed by the buffer, resulting in a lower peak speed, and then the appropriate rate of change can be selected.

Figure 6A:
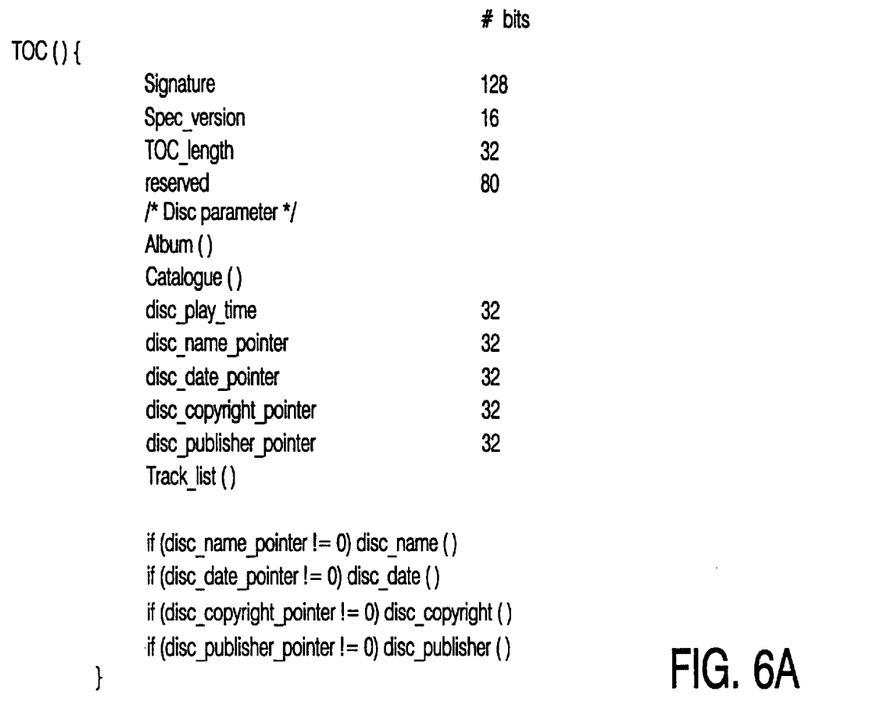
Figure 6B:
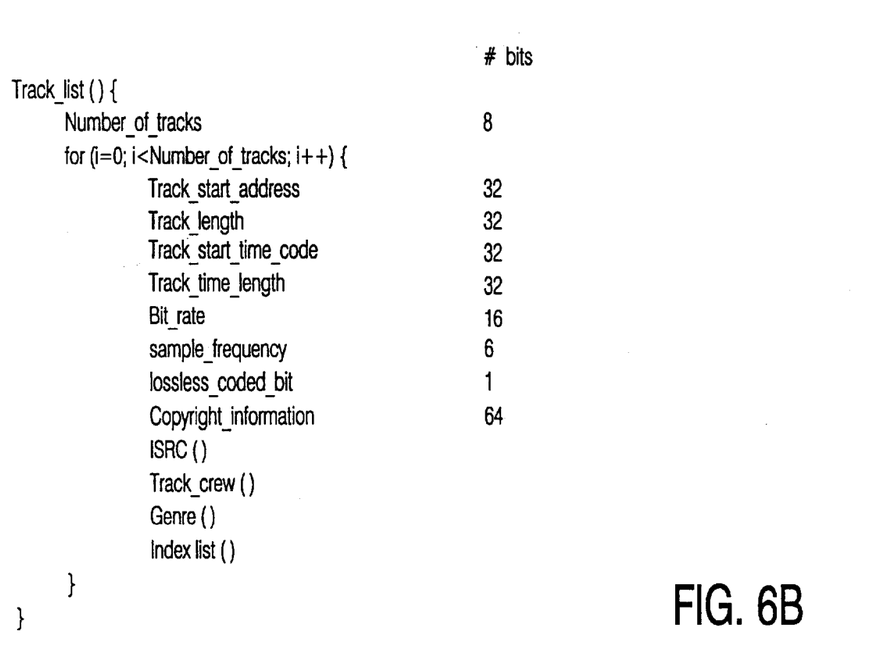

FIG. 6 shows transfer speed profile information recorded in a separate area of the disc shaped record carrier. FIG. 6*a* shows in particular the syntax of a Table of Contents (TOC). The TOC is located in an area separate from the audio information, e.g. in a separate file 12 or in a lead-in area 13 as schematically indicated in FIG 1*a*. In the syntax of the TOC parameters are given with their respective size in bits, whereas parameters of a variable length are indicated by a name followed by parenthesis, e.g. name (). The first parameter, called signature, identifies the type of TOC, and the spec_version indicates the version of the standardized specification for the record carrier. Then the total length of the TOC is indicated and after some reserved space and space for an Album and Catalogue indication (e.g. text strings) there are given the total play time and pointers to the name, date, copyright and publisher text strings, which text strings themselves (if any) follow after a track list. The track list, as shown in FIG. 6*b*, contains control information for a plurality of items of audio information, here called tracks as usual for CD audio. First the number of tracks is given, and in addition pointers to the start of the control information for each track may be included (not shown). In a for-loop syntax for each track the start address, the length (e.g. in sectors), the start time (sum of the playing time of all previous tracks) and the playing time length of that track are given. The transfer speed profile information comprises a bitrate for each track, representing the transfer speed profile for each item of audio. Further an indication of the type of compression used, i.e. the sample frequency and the lossless coded bit indicating the use of the lossless compression. The track information further includes copyright information, a source code according to the ISRC code known from CD audio, and information about the performance (track-crew and genre). Finally a list of index points is present, comprising a number of points within the playing time of the track, which can be accessed directly by the user, e.g. as known from CD. Instead of a fixed bit rate for the whole track, also a list of speed indicators could be included in the TOC, for example in a list of bitrate/address parameters like the index list. Also the transfer speed profile for each item or for the whole disc may be combined with the other information and stored in a separate control file.

Although the invention has been explained by embodiments using audio information, it will be clear the invention can be employed for storing any type of information having a real time character, which is to be compressed to variable bitrate data. Moreover audio information can be stored in combination with other information, such as video information, using a speed profile according to the invention. Further, the invention lies in each and every novel feature or combination of features. For example the embodiments show a disc shaped record carrier, but the invention can be applied also to other record carriers of different shape, like a tape.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. The scope of the invention is not limited to the embodiments, but lies in each and every novel feature described above and in every novel combination of these features. Thus, the scope of the invention is only limited by the following claims:

What is claimed:

1. A method for recording audio information on a record carrier, the method comprising the steps of:

encoding the audio information into compressed audio data having a variable bitrate;

recording the compressed audio data at a transfer speed; and controlling the transfer speed depending on the variable bitrate including:

determining a transfer speed profile for an item of audio information in which profile the average transfer speed is higher than an average transfer speed minimally required to transfer the compressed audio data of the item;

adding stuffing data to the compressed audio data according to the transfer speed profile; and recording transfer speed profile information on the record carrier for enabling playback at a transfer speed as indicated by the transfer speed profile information.

2. The method of claim 1, in which the recording at the transfer speed includes:

storing the compressed audio data of at least part of the item in an edit buffer; and, after the determining the transfer speed profile, recording the contents of the edit buffer on the record carrier.

3. The method of claim 2, in which the recording of the contents of the edit buffer on the record carrier occurs at a speed higher than the transfer speed.

4. A recording device for recording audio information on a record carrier, the device comprising:

compression means for encoding the audio information into compressed audio data having a variable bitrate;

recording means for recording the compressed audio data at a transfer speed; and control means for controlling the transfer speed depending on the variable bitrate and for determining a transfer speed profile for an item of audio information in which profile the average transfer speed is higher than an average transfer speed minimally required to transfer the compressed audio data of the item; and data combination means for adding stuffing data to the compressed audio data according to the transfer speed profile; and in which the recording means records transfer speed profile information on the record carrier for enabling playback at a transfer speed as indicated by the transfer speed profile information.

5. A record carrier comprising:

audio information encoded as compressed audio data having a variable bitrate;

transfer speed information for controlling a transfer speed at playback, the transfer speed information including transfer speed profile information indicating the transfer speed at playback for an item of audio information, in which profile the average transfer speed is higher than an average transfer speed minimally required to transfer the compressed audio data of the item; and stuffing data in addition to the compressed audio data, according to the transfer speed profile.

6. The record carrier of claim 5, in which the transfer speed profile includes a fixed bitrate per item.

7. The record carrier of claim 5, in which the transfer speed profile includes per item, at least one speed indicator of a bitrate at a specified time within the item.

8. The record carrier of claim 5, in which the transfer speed profile includes per item, at least one speed change indicator.

9. The record carrier of claim 5, in which:

the record carrier has a disc shape; and the transfer speed profile includes a rotation rate of the record carrier as an indication of the bitrate.

10. The record carrier of claim 5, in which the record carrier includes a separate area and only the transfer speed profile is recorded in the separate area of the record carrier.

11. A playback device for retrieving from a record carrier, the device comprising:

reading means for retrieving compressed audio data at a transfer speed;

control means for controlling the transfer speed; and data selection means for retrieving transfer speed profile information from the record carrier and for removing stuffing data from the data retrieved; and in which the control means sets the transfer speed for an item of audio information according to the transfer speed profile.

12. The playback device of claim 11, in which the device further comprises de-compression means for decoding the compressed audio data having the variable bitrate.

13. The playback device of claim 11 in which:

the carrier is a disc-shaped record carrier; and the control means calculates a rotation rate for the record carrier depending on the transfer speed profile.

\* \* \* \* \*